United States Patent
Eshelman

[11] 3,848,736
[45] Nov. 19, 1974

[54] TIRE BUMPER KIT

[76] Inventor: Cheston Lee Eshelman, 621 N.E. 30th Ter., Miami, Fla. 33137

[22] Filed: Feb. 22, 1972

[21] Appl. No.: 228,035

Related U.S. Application Data

[63] Continuation-in-part of Ser. No. 88,059, Nov. 9, 1970, abandoned.

[52] U.S. Cl............ 206/223, 29/407, 150/54 A, 206/335, 224/42.04, 293/1, 293/19, 293/60, 293/71 P
[51] Int. Cl... B65d 79/00, B65d 81/32, B65d 85/00
[58] Field of Search......... 224/42.04; 293/1, 19, 62, 293/63, 69, 71 R, 71 P, 1, 60, 70; 29/407; 150/54 A; 206/46 H, 47 R, 223, 335

[56] References Cited
UNITED STATES PATENTS

| | | | |
|---|---|---|---|
| 990,805 | 4/1911 | Cormier | 293/19 |
| 1,437,181 | 11/1922 | Hirst | 206/46 H |
| 1,672,335 | 6/1928 | O'Meara | 293/71 P X |
| 1,753,483 | 4/1930 | Stevens | 224/42.04 |
| 2,080,989 | 5/1937 | Smith | 224/42.04 X |
| 2,104,235 | 1/1938 | Lyon | 150/54 A |
| 2,196,225 | 4/1940 | Morrison | 224/42.04 |
| 2,358,481 | 9/1944 | Slack | 224/42.04 |
| 2,603,527 | 7/1952 | Perkins | 293/69 X |
| 2,835,222 | 5/1958 | Hall | 150/54 A |
| 2,935,330 | 5/1960 | Millman | 293/19 X |
| 3,074,751 | 1/1963 | Gerin | 293/19 |
| 3,140,111 | 7/1964 | Dabroski | 293/62 X |
| 3,232,420 | 2/1966 | Haenle, Jr. | 206/46 H |
| 3,502,362 | 3/1970 | Eshelman | 293/19 |
| 3,581,882 | 6/1971 | Bish | 206/47 R |
| 3,589,507 | 6/1971 | Greenberg | 206/47 R |
| 3,603,633 | 9/1971 | Eshelman | 293/19 |
| 3,610,411 | 10/1971 | Coleman | 206/47 R |
| 3,620,364 | 11/1971 | Lynch | 206/46 H |
| 3,703,956 | 11/1972 | Oswalt | 206/47 R |
| 3,708,195 | 1/1973 | Kottsieper | 293/19 X |
| 3,741,382 | 6/1973 | Larimer, Sr. | 206/47 R |

Primary Examiner—M. Henson Wood, Jr.
Assistant Examiner—Howard Beltran

[57] ABSTRACT

A multiple parts kit comprising a plurality of differently shaped structural elements so formed and dimensioned that they may be assembled together to form a rigid platform for mounting on the forward end of a motor vehicle to carry substantially horizontally thereon a spare wheel and tire; said structural elements consisting of an elongated tubular support member, a collar dimensioned to fit over the tubular member, a U-shaped support bar, a stop member mountable on the tubular member, a hub spacer for carrying a spare wheel and tire, two side braces, and an assortment of nuts, bolts, and washers, all of said elements being packaged in a suitable container.

4 Claims, 11 Drawing Figures

PATENTED NOV 19 1974 3,848,736

INVENTOR.

BY Cheston Lee Eholm

INVENTOR.

BY Cheston Lee Eshelman

TIRE BUMPER KIT

This application is a continuation-in-part of my co-pending application Ser. No. 88,059, filed Nov. 9, 1970, now abandoned.

In my prior U.S. Pat. Nos. 3,502,362 and 3,603,633 I describe front end shock absorbing devices mounted on the front of vehicles for preventing or reducing the destructive results of head-on collisions. The problems which the inventions of those patents are intended to solve, and the solutions therefor, are amply described in the noted patents so that further explanation in those regards need not be repeated here.

My present invention resides in the provision of a packaged assembly or kit of structural members which can be assembled together on the front of a motor vehicle to support the spare wheel and tire in a substantially horizontal position forwardly of the vehicle. In such position, should the vehicle strike an obstruction head-on, such as a tree, wall, or another vehicle, the spare tire will first contact the obstruction and absorb the shock of the collision and prevent or minimize damage and injuries to the vehicle and occupants. It is desirable that the spare wheel and tire be so mounted that it tilts slightly upwardly at its front end to avoid under-riding the bumpers of other cars.

My kit of parts is termed an adjustable structure because its parts are constructed so as to allow them to be fitted together in different arrangements as required by particular size and shape of the specific vehicle they are to be mounted upon. If this adjustability were not provided it would be necessary to provide a different kit for each make and model of vehicle. It is contemplated that this kit of parts will be made available so that any car owner can, if he so desires, equip his car with the Tire Bumper as herein described. Conversely, the kit could be used by manufacturers to mount the Tire Bumper on the vehicle during its manufacture.

With the ever increasing incidence of traffic collisions resulting in many deaths, even more injuries, and mounting costs for damages to vehicles and other property, the wide-spread use of my invention would do much to lessen the destructive effects of automobile accidents.

It is an object of this invention to provide in a packaged form an assembly or kit of structural parts which may be fitted together and mounted on the front end of any American type motor vehicle to carry the spare wheel and tire in a forward position where it will receive and absorb the shock of a head-on collision whereby to prevent or greatly reduce the effects of such collisions.

It is a further object of the invention that the structural parts of my kit shall be so formed as to interfit with each other and any particular vehicle so as to be applicable to any American type vehicle regardless of size or design.

It is a still further object of this invention that the parts of the kit shall be so constructed and arranged as to require a minimum of metal work to attach them to an existing vehicle.

It is another object of this invention that the kit of parts may be attached to a vehicle in the course of its manufacture or at a later time to a completely manufactured one.

For further comprehension of the invention reference may be had to the accompanying drawings wherein.

Figure 1:
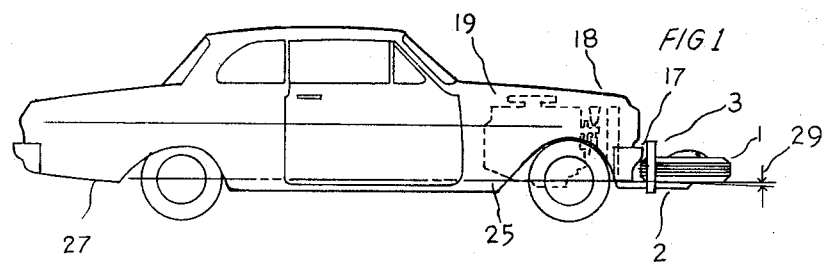
FIG. 1 is a side elevation view showing the spare wheel and tire mounted on a vehicle forwardly of the front bumper.
Figure 2:
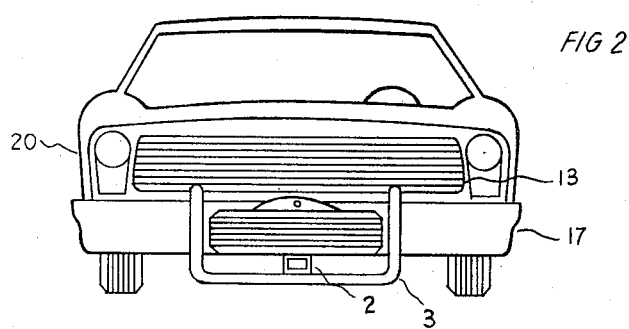
FIG. 2 is a front view showing the spare wheel and tire in mounted position at the front bumper level.
Figure 3:
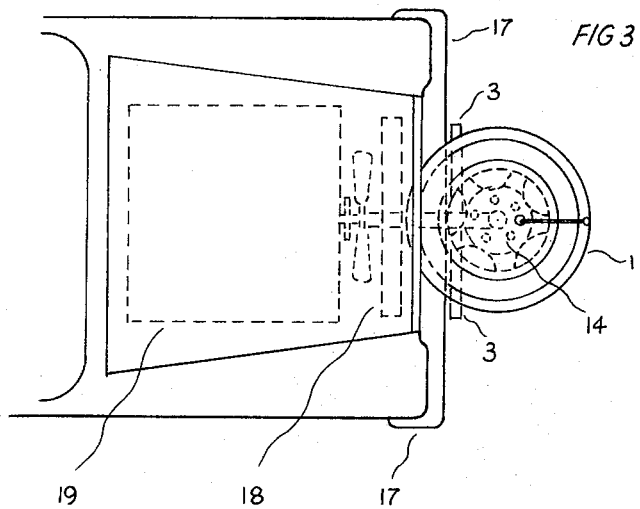
FIG. 3 is a top plan view showing the spare wheel and tire in position on a vehicle with the rear portion of the tire spaced rearwardly of the front bumper but forwardly of the radiator.
Figure 4:
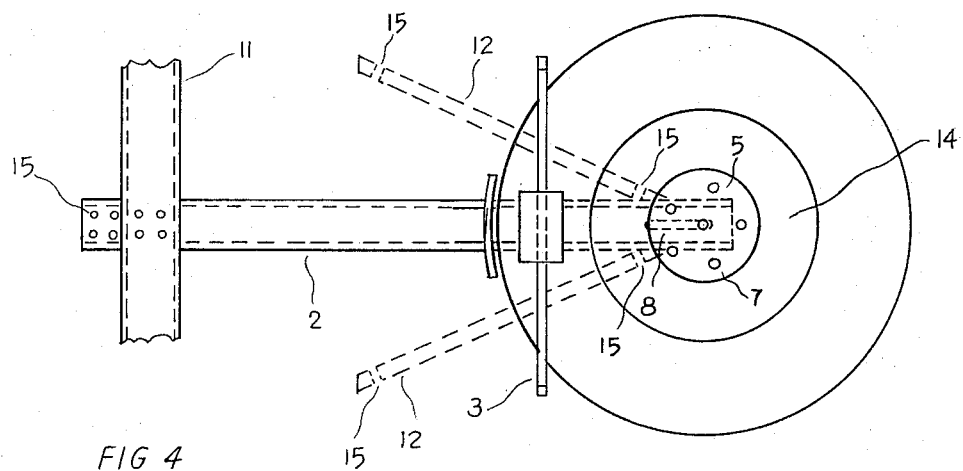
FIG. 4 is a fragmentary top plan view showing the preferred arrangement of the parts of the disclosed kit when mounted on a vehicle.
Figure 5:
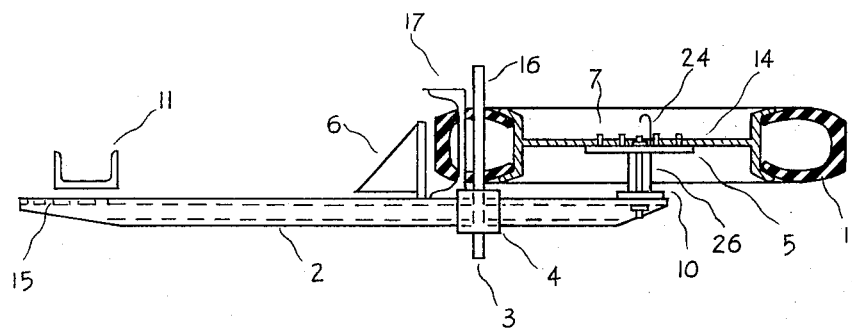
FIG. 5 is a side elevation view of the arrangement of FIG. 4.
Figure 6:
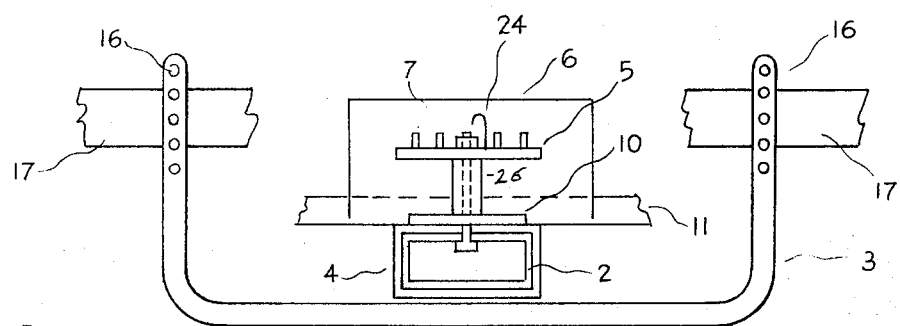
FIG. 6 is a front elevation view of the arrangement shown in FIGS. 4 and 5.

The arrangement of the structural members of the above-described kit on an auto road vehicle is best seen by reference to FIGS. 1–6 of the drawings, in particular FIGS. 4–6. As is evident in FIGS. 1 and 5 especially, the members form a connected framework which extends forwardly of the vehicle and carries the spare wheel and tire 1 on it. The spare wheel and tire 1 may be positioned forwardly of the bumper as shown in FIG. 1, or it may nest in a recess in the bumper but forwardly of the radiator as shown in FIG. 3.

Referring again to FIGS. 4–6, there is shown a mounting structure that is adjustable for various sizes and makes of cars so that one universal type frame can be attached to all cars on the road. A longitudinal support tube 2 has open ends and at its rear end a number of punched holes 15 are provided so that it can be bolted to the car front axle cross frame 11 using the holes 15 that match with the cross frame. The longitudinal support tube 2 is preferably made of steel about 2 inches by 4 inches by ¼ inch wall or may be of any other suitable cross-section that will serve the intended purpose. A stop 6 is welded or otherwise rigidly mounted on the tube 2. At the front end of the tube 2 there is a slotted hole 8 to allow a hub spacer 26 mounted therein to slide rearwardly. The slot can be extended forwardly if necessary to allow the wheel and tire to be moved forward for dismounting.

A vertical support U-bar 3 is welded to a collar 4 that slides over the longitudinal tube 2. A choice of holes 16 is provided on each leg of the U-bar to facilitate its being bolted to the bumper at any one of several vertically spaced positions. Depending upon the construction of the vehicle the U-bar may be located forwardly or rearwardly of the stop 6. Thus it can be seen that the longitudinal tube 2 and the U-bar 3 are so constructed that they can be attached to any car in proper longitudinal and vertical relation no matter what the dimensions of the particular car may be.

The members so far described may be installed so as to give the spare wheel and tire a slight upward pitch or tilt forwardly of the vehicle. This pitch is shown at 29 in FIG. 1 and would be desirable on low profile vehicles to avoid under-riding the bumpers of higher other vehicles. Conversely, the pitch could be downward for high profile vehicles, i.e., trucks and buses, to avoid over-riding the bumpers of lower vehicles.

Two side braces 12 are provided which extend from either side of the front of the longitudinal tube 2 and which angle back for attachment to the car frame 25 or to the front end of the car strut bar (not shown). Holes 15 are provided in either end of the side braces to facilitate the attachment described.

Figure 8:
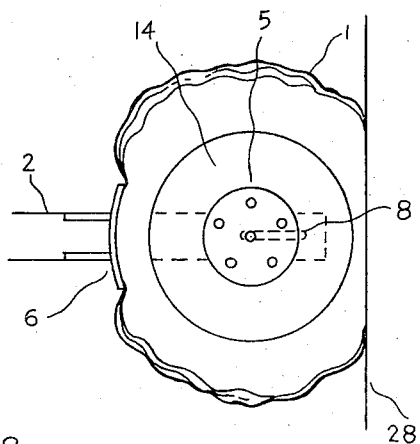
FIG. 8 shows the mounted spare tire profile distorted at the moment of collision with a forward obstruction.

At the point where the rear of the periphery of the spare wheel and tire will be located when mounted, the stop 6 is welded to the tube 2. This stop is provided as a barrier to prevent the tire from moving back without resistance upon a collision. If such a collision occurs, the tire bumper will strike the obstruction and be forced back against the stop. The tire will thereupon be deformed as is shown in FIG. 8 and, in so doing, absorb all or most of the destructive forces generated. The energy absorbent potential of the inflated tire is approximately 5 inches at the front of the tire and 5 inches at the rear, or a total of 10 inches of compressed air, rubber, and cord. This excludes resistance offered by the metal wheel itself. This effect is clearly shown in FIG. 8.

Figure 7:
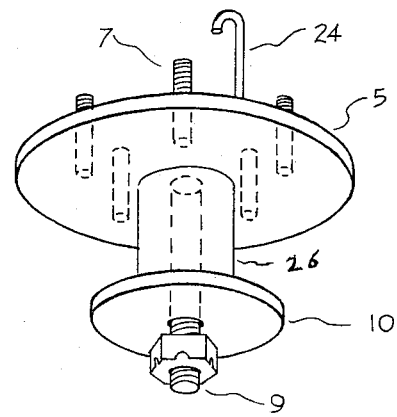
FIG. 7 shows one form of the hub spacer assembly designed for use with vehicles using the five-lug bolt type wheel.

As shown in FIG. 7, the wheel is held in place on its supporting framework by a hub spacer 26 with a top flange 5 carrying the same size and number of lug bolts 7 as are used to the wheel on the car. At the bottom of the spacer there is a flange 10 that slides on the top wall of the tube 2 when the spacer is mounted on the tube. The spacer is held slidably in place on the tube by a king-pin 9 which through the spacer hub flanges and the slotted hole 8. The flanges 5 and 10, and the tubular part that separates them and through which the king-pin passes, are all welded together.

Figure 7A:
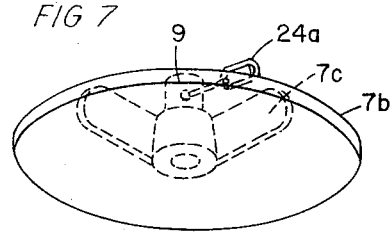
FIG. 7A shows an alternate form of hub spacer assembly for vehicles using wheels other than the five-lug bolt type.

In FIG. 7A a modification is shown of the hub spacer assembly of FIG. 7 for use with cars which do not use the five-lug bolt type wheel. It can, as a matter of fact, be used also with the five-lug wheel.

In the modification the hub spacer 26 remains substantially unchanged but the lug bolts 7 and the keeper 24 are dispensed with. A large washer 7b replaces the lug bolts 7. When a wheel is placed on upper flange 5, the washer 7b which is larger than the wheel hole, is placed on top of the wheel over the king-pin. A large wing nut 7c is then screwed on the king-pin tightly against the washer 7b to hold the wheel securely in place. A lock 24a is provided to prevent unauthorized removal of the wheel.

Figure 9:
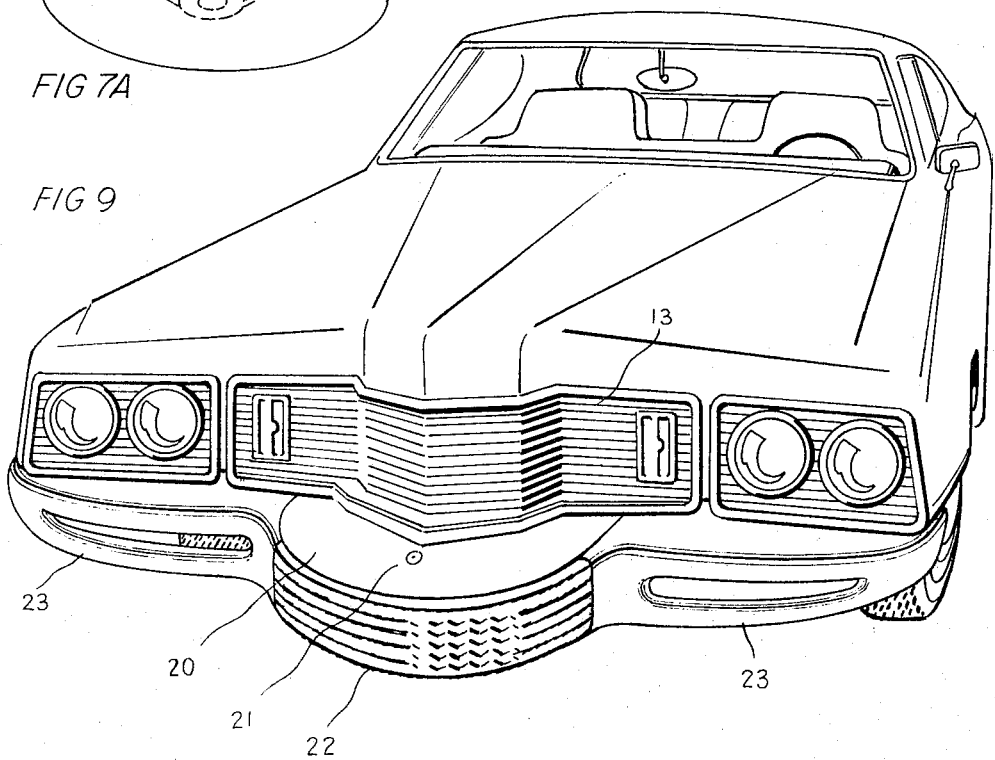
FIG. 9 is a three-quarter front view showing a newly manufactured vehicle equipped with the Tire Bumper and having the front of vehicle designed to blend with the spare wheel and tire.

Referring to FIG. 9, the application of the invention to a new car coming from the factory shows slanted bumpers 23 and grill 13 designed around the rear half of the spare wheel and tire 22 and the bumper halves slanted from the fender forward to about the widest transverse dimension of the tire 22, so that when an obstruction is off center of the tire the slanted bumpers 23 will tend to deflect the car around said obstruction. In this application of the invention the U-bar 3 would be bolted to the inside surface of the bumper for appearance and the tire 22 with the exception of the front tread which is exposed for a contact would be covered with a removable case 20 and said case is held in place at the edges of the slanted bumper halves and in the center by a lock 21 which fastens to a keeper 24 which is welded to the top of the flange 5. The front of the tire is exposed so that when it collides it will hit squarely on the rubber tread. The slanting bumpers on each side of the tire are indicated at 23 extending out to the fenders on each side of the car body 27. An obstruction collided with is shown at 28 in FIG. 8.

Figure 10:
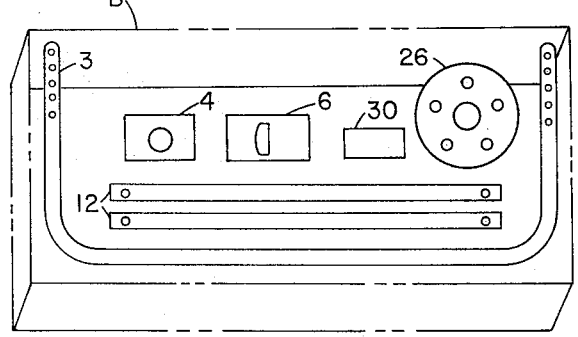
FIG. 10 shows the arrangement of the structural parts of the disclosed packaged kit, the letter B indicating schematically a box or bag container for the parts.

As shown in FIG. 10 the structural parts of the packaged kit consist of those which are listed below, each of which has been fully described above:

1 — longitudinal support tube or equivalent (2)
1 — collar (4)
1 — U-bar (3)
1 — stop (6)
1 — hub spacer subcombination (26)
2 — side braces (12)
1 — box of necessary bolts, nuts, and washers (30)

The container for the parts of the kit is not significant in itself except as it lends itself to making the kit a self-contained, packaged mercantile unit.

It should be assumed, however, that an operative device cannot be devised using less than all the parts of the kit or that an installation cannot be arranged using parts which do not resemble those disclosed while performing the same functions. On the contrary, many changes could be made in the above-described invention that would be readily apparent to those skilled in the art. It is, therefore, intended that all matter contained in the above description should be interpreted as illustrative and not in a limiting sense and that the scope of the invention shall be defined by the claims.

Having thus described my invention, I claim:

1. A multiple parts kit comprising a plurality of differently shaped structural elements so formed and dimensioned that when assembled together they form a rigid platform for mounting on the forward portion of a motor vehicle to carry substantially horizontally thereon a spare wheel and tire; said kit comprising a U-shaped element having means for attaching it to the bumper of a highway vehicle in one of several vertical positions, an elongated element having means at one end for attachment to a cross frame member of the highway vehicle, a collar-like member for encircling said elongated element for connecting it to the U-shaped element, a support member for mounting on the elongated member to carry a tire and wheel, means being provided on the elongated member to accommodate longitudinal movement therealong of the support member, a stop for mounting on the elongated member to limit said longitudinal movement, two rod-like side braces for rigidifying the assembled platform, and an assortment of nuts, bolts and washers for assembling the parts of the kit.

2. The invention as set forth in claim 1, wherein the means for attaching the U-shaped member to the bumper comprises a series of apertures on the legs of the U, the elongated element is tubular in cross-section and the means for attachment at one end thereof comprises a series of apertures.

3. The invention as set forth in claim 2, wherein the means on the elongated member to provide movement therealong of the wheel support member comprises a slotted aperture, the wheel support member comprises a tube having rigidly attached to each end thereof a flange of larger diameter than said tube, said wheel support member to be mounted in the slotted aperture with a king bolt included with the nuts, bolts and washers.

4. The invention as set forth in claim 3, wherein the side braces are provided at each end with an aperture to facilitate their attachment to the other elements and means is provided on the wheel support member for securely mounting a tire and wheel thereon, said means comprising a plurality of fixed lug bolts spaced to match the bolt holes of the wheel to be mounted.

* * * * *